Figure 1:
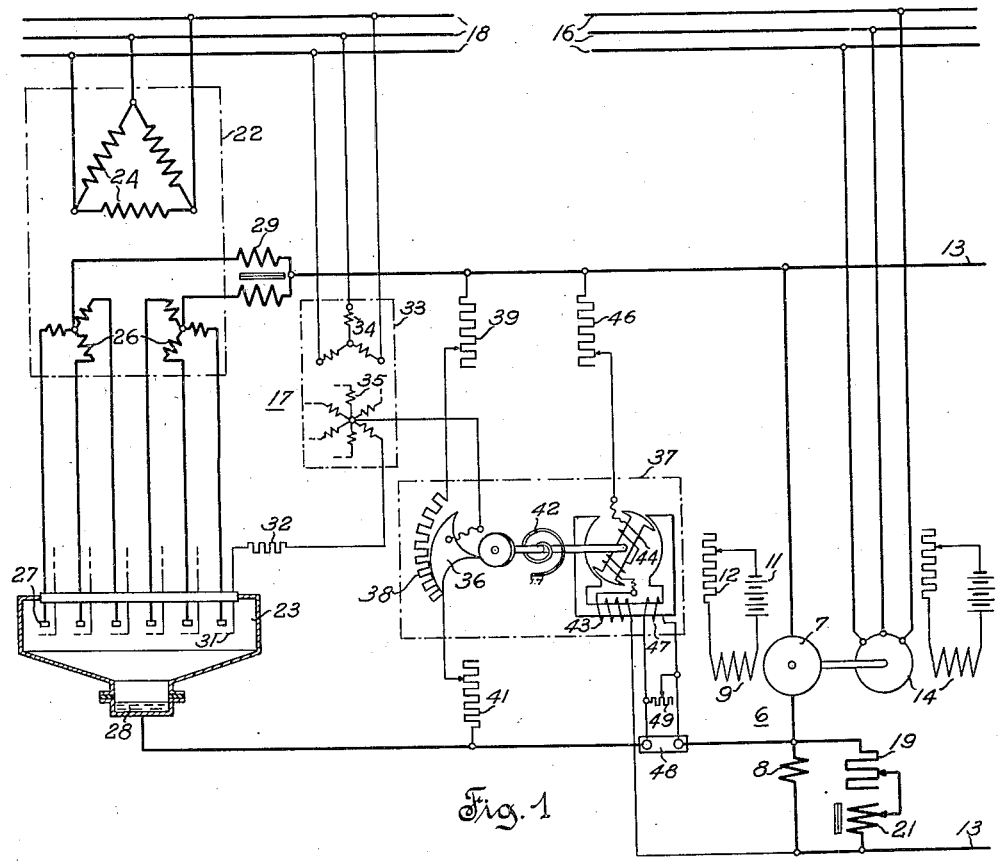

Dec. 25, 1945.  J. G. LINN  2,391,787
ELECTRIC CURRENT CONVERTING SYSTEM
Filed Dec. 8, 1943  3 Sheets-Sheet 1

Inventor
James G. Linn
by Didier Journeaux
Attorney

Dec. 25, 1945.   J. G. LINN   2,391,787
ELECTRIC CURRENT CONVERTING SYSTEM
Filed Dec. 8, 1943   3 Sheets-Sheet 2

Inventor
James G. Linn
by Didier Journeaux
Attorneys

Dec. 25, 1945.  J. G. LINN  2,391,787

ELECTRIC CURRENT CONVERTING SYSTEM

Filed Dec. 8, 1943  3 Sheets-Sheet 3

Inventor
James G. Linn
by Didier Journeau
Attorney

Patented Dec. 25, 1945

2,391,787

UNITED STATES PATENT OFFICE 2,391,787

ELECTRIC CURRENT CONVERTING SYSTEM

James G. Linn, West Allis, Wis., assignor to Allis-Chalmers Manufacturing Company, Milwaukee, Wis., a corporation of Delaware Application December 8, 1943, Serial No. 513,436

9 Claims. (Cl. 171—312)

This invention relates in general to improvements in electric current converting systems and more particularly to means for regulating the flow of current through a dynamoelectric machine and an electric valve converting system connected to a common supply or load circuit.

Current converting systems of the electric valve type are frequently connected with supply circuits therefor to operate in parallel with dynamoelectric machines functioning as motors, or are connected with load circuits therefor to operate in parallel with dynamoelectric machines functioning as generators. It is not generally feasible, however, to impart to a converter and to a dynamoelectric machine associated therewith such inherent voltampere characteristics as would result in the desired current distribution therebetween. Means are therefore generally provided for controlling the conductivity of the valves of the converter in such manner as to obtain the desired characteristics for the system.

The regulators generally utilized for this purpose however require a substantial time to complete their response to a change in an operating condition of the system to be regulated, and serious disturbances may take place during this time of response. For example, if an alternating current rectifying system is connected in parallel with a substantially flat compounded direct current generator a sudden decrease in the load will cause the output voltage of the converter to rise above the terminal voltage of the generator a substantial extent before the regulator returns it to its desired value. The rise in the converter voltage may be sufficient to cause the converter to supply current to the generator which then operates as a motor, thereby causing operation of the usual protective devices associated therewith to place the converter and the generator out of operation.

Such disturbances are avoided by causing the flow of current through the converter to modify the characteristic of the dynamoelectric machine. In a preferred embodiment of the invention a dynamoelectric machine provided with an armature winding and a series field winding is associated with a converter effectively connected in parallel with the armature winding to thereby modify the action of the field winding. A shunt having predetermined inductance may be connected in parallel with the series field winding to further modify the action of the field winding or to limit the modifying effect of the converter thereon to periods of transient operation of the system.

The converter may be provided with a regulator imparting thereto a predetermined characteristic. The regulator may also cause a predetermined distribution of current between the converter and the dynamoelectric machine, thereby modifying in effect the characteristic of the converter in dependence upon the characteristic of the machine.

It is therefore an object of the present invention to provide an electric current converting system in which the characteristic of a dynamoelectric machine is modified by a static converter associated therewith.

Another object of the present invention is to provide an electric current converting system in which current distribution between a static converter and a dynamoelectric machine is controlled by an electromechanical regulator during steady state operation and is controlled by static means during transients.

Another object of the present invention is to provide an electric current converting system in which the characteristic of a dynamoelectric machine is different during steady state operation and during transients.

Another object of the present invention is to provide an improved electric current converting system in which the characteristic of a static converter is modified by a dynamoelectric machine operating in parallel therewith.

Figure 2:
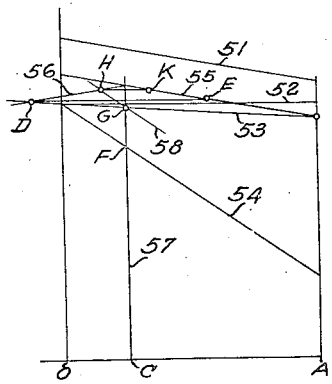
Figure 3:
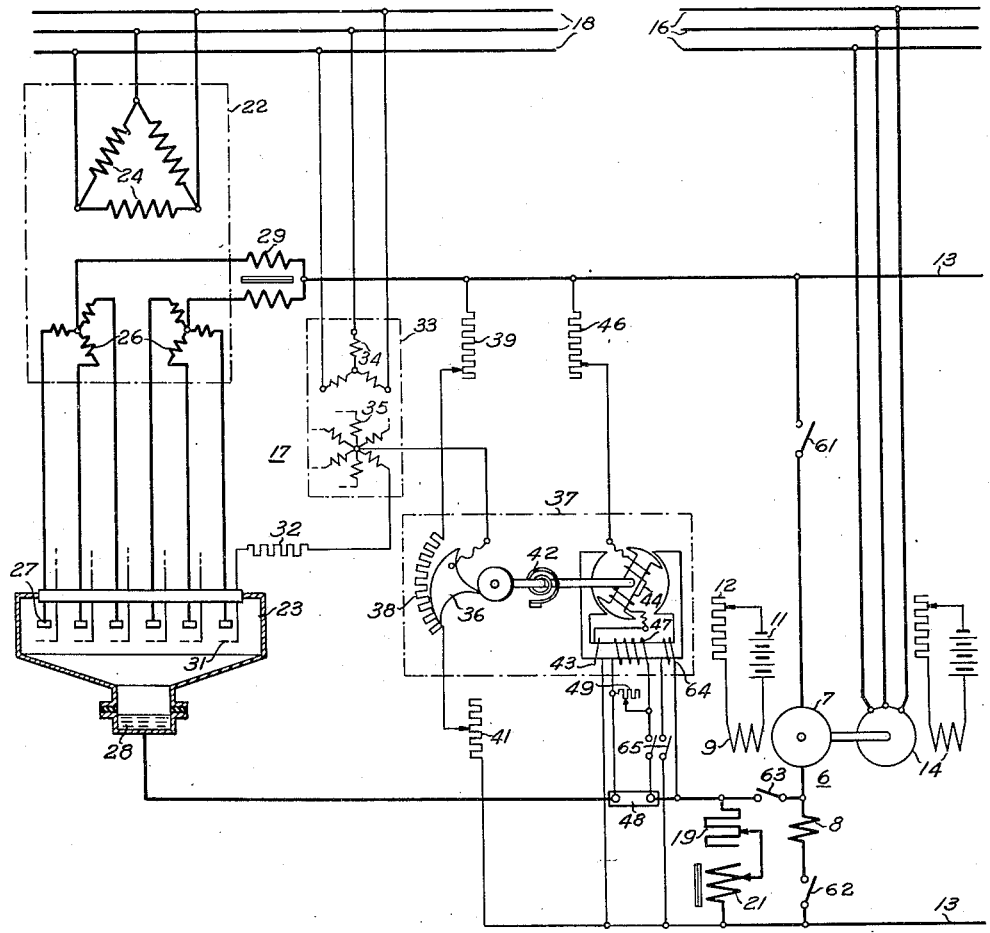
Figure 4:
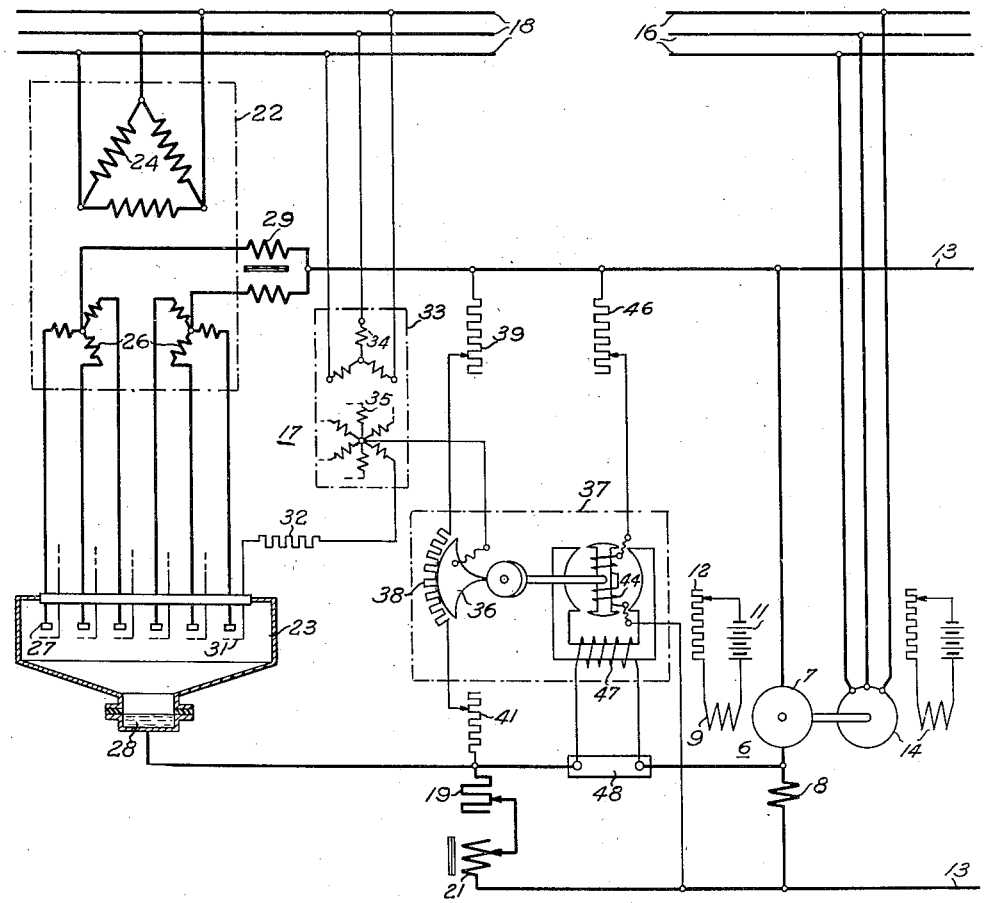

Objects and advantages other than those above set forth will be apparent from the following description when read in connection with the accompanying drawings, in which:

Fig. 1 diagrammatically illustrates one embodiment of the invention in which the series field of a compound direct current generator is partially controlled by the current of a static converter provided with an electromechanical regulator imparting thereto a predetermined characteristic;

Fig. 2 is a diagram of the operating characteristics of the dynamoelectric machine and of the static converter illustrated in Fig. 1;

Fig. 3 diagrammatically illustrates a modified embodiment of the present invention in which the regulator is partially controlled by the current of the dynamoelectric machine, and Fig. 4 diagrammatically illustrates a further modified embodiment of the present invention differing from the embodiment illustrated in Fig. 3 in the manner of connecting the regulator to the circuits of the system.

Referring more particularly to Fig. 1 of the drawings by characters of reference, a dynamoelectric machine 6 is provided with an armature 7, a series field winding 8 and another field winding 9 excited from a suitable source, such as a battery 11, through an adjusting rheostat 12. Machine 6 may be a generator or a motor but it will be assumed that it operates as a generator to supply current to a direct current circuit 13 across which armature 7 and field winding 8 are serially connected. Generator 6 is driven by any suitable means such as a synchronous motor 14 receiving current from a suitable alternating current circuit 16.

A static converter 17 of the electric valve type is effectively connected in parallel with armature 7 and is connected with a suitable alternating current circuit 18 for the conversion of current between circuits 18 and 13. Circuits 18 and 18 may be interconnected but trouble-free operation of the system is more difficult to secure when the circuits are separate as the voltages of the two circuits may then vary relatively to each other both in magnitude and in frequency.

When machine 6 operates as a generator, converter 17 is so arranged as to rectify current supplied thereto from circuit 18 and to supply the rectified current to circuit 13 through winding 8 to thereby modify the characteristic of generator 6. Winding 8 may be bridged by an adjustable shunt 19 which may be rendered inductive by means of an adjustable reactor 21 serially connected therewith, to further modify the effect of the current of converter 17 on the operation of winding 8 or to limit such effect to periods of transient operation of the system.

Converter 17 may be of any suitable known type and may comprise a transformer 22 and a plurality of electric valves 23. Transformer 22 comprises a primary winding 24 connected with the conductors of circuit 18 and a secondary winding 26 divided into a plurality of phase portions severally connected with the anodes 27 of the different valves. The valves may be provided with separate cathodes or the cathodes may be combined into a single cathode structure 28 connected with one of the terminals of armature 7. Winding 26 is preferably arranged to define a plurality of neutral points severally connected with the other terminal of armature 7 through an interphase transformer 29. Suitable known means (not shown) are provided for rendering the cathode emissive and for maintaining it in electron emitting condition as is well known.

The conductivity of valves 23 may be controlled by any suitable means such as control electrodes 31 of the grid type severally associated with anodes 13. Each control electrode is connected with cathode 28 through a control circuit comprising a current limiting resistor 32 and one of the secondary phase portions of a control transformer 33. The primary winding 34 of transformer 33 is energized from circuit 18 and the secondary winding 35 thereof is connected in star to provide a neutral point connected with the movable tap or sector 36 of a regulator 37. Sector 36 is associated with a resistor 38 to form a rheostat connected with any suitable source of current such as armature 7 through adjusting rheostats 39, 41. Sector 36 is actuated by an electromagnetic mechanism against the action of a spring 42 preferably so dimensioned as to oppose a substantially constant torque to the movement of the sector regardless of the position thereof.

The regulator actuating mechanism comprises a field winding 43 connected across circuit 13 through the armature winding 44 of the regulator and through an adjusting rheostat 46. A second field winding 47 is energized from a shunt 48 inserted in one of the connections of converter 17 with armature 7. The current through winding 47 may be adjusted by means of a shunt rheostat 49. As a result of the inertia of the movable elements of the regulator the latter operates with a substantial time of response in dependence upon sudden variations in the flow of current through circuit 13.

In operation, circuit 18 being energized, transformer 33 impresses on the different control electrodes 31 alternating potentials which render the different valves 23 intermittently conductive in sequence. Winding 26 impresses on valves 23 voltages which bring anodes 27 sequentially to positive potentials with respect to the potential of cathode 28 to transmit current sequentially from winding 26 to suitable current consuming devices, such as electric motors (not shown), through shunt 48, winding 8 in parallel with shunt 19 and reactor 21 and through circuit 13. Each valve however becomes effective only when its control electrode has a potential which is more positive than the potential of cathode 28. The flow of current is returned from circuit 13 to winding 26 through interphase transformer 29.

Once circuit 13 is energized a current flows through resistor 38 and rheostats 39, 41. The voltage drop through rheostat 41 and through the portion of resistor 38 below the contact point of sector 36 is added to the voltage of winding 35. This voltage drop constitutes a negative potential component impressed on control electrodes 31 which retards the moments of positive energization thereof from winding 35 and thereby causes the output voltage of the converter to decrease as is well known. If the neutral point of winding 35 were connected directly with cathode 28 the flow of current through the valves would take place through the different valves at the maximum possible voltage. The voltage impressed on circuit 13 from converter 17 would however decrease with increasing load and the converter would have a relatively steeply drooping volt ampere characteristic such as characteristic 51 in Fig. 2.

The interaction of windings 43, 44 of regulator 37 tends to cause displacement of sector 36 in such a manner as to cause the output voltage of converter 17 to be lowered to a substantially constant value determined by the characteristic of spring 42 and thereby impart to the converter a flat characteristic 52. This action is modified by winding 47 which is preferably so adjusted by rheostat 49 as to cause the characteristic of the converter to droop slightly as shown at 53. If it is desired that converter 17 and generator 6 deliver equal currents, characteristic 53 is chosen identical to that of generator 6 operating alone. Characteristic 53 is a static characteristic based on the assumption that the flow of current through converter 17 does not vary or varies so slowly as to enable regulator 37 to regulate the voltage of the converter without noticeable time lag.

Circuit 16 is also assumed to be energized so that motor 14 drives armature 7 at constant speed to generate current to be supplied to the current consuming devices through winding 8 in parallel with shunt 19 and reactor 21. It will first be assumed that the shunt path around winding 8 has a resistance substantially equal to that of winding 8 and a ratio of inductance to resistance also substantially equal to that of winding 8. The currents through winding 8 and through shunt 19 will therefore be equal during steady state operation. These currents will also vary at the same rate during transients and therefore will remain equal.

If winding 8 were short circuited generator 6 would have a steeply drooping characteristic such as characteristic 54 in Fig. 2. If the generator operated alone with winding 8 receiving the full current of armature 7 the generator would have characteristic 53, the difference between the ordinates of characteristics 53 and 54 being the voltage induced in armature 7 by the flow of its own current through winding 8. In the system of Fig. 1 adjusted as assumed hereinabove, winding 8 always carries one-half of the load current. During steady state operation, if armature 7 at any time carried less than one-half of the load current, its voltage would rise above characteristic 53 and the armature current would increase. Conversely, if armature 7 carried more than one-half of the load current its voltage would drop below characteristic 53 and the armature current would therefore decrease. The current of armature 7 must therefore be equal to one-half of the load current, and also equal to the current of converter 17.

During transient operation however those conditions no longer obtain. Let the currents of generator 6 and of converter 17 be represented at a predetermined instant by abscissa OA. The generator and the converter then both operate at point B of characteristic 53. Abscissa OA also represents one-half of the load current. Assume that the value of the half load current suddenly decreases to a value OC. Until regulator 37 changes its position, converter 17 will operate along a line 55 parallel to line 51 and intersecting characteristic 53 at point B.

As abscissa OC represents the new average of the converter current and of the generator current, the generator operating point must be on a line 56 symmetrical of line 55 with respect to line 57 of abscissa OC. If the converter and the generator were connected in parallel across circuit 13 the generator would continue to operate with characteristic 53 as the current of winding 8 would remain the same as that of armature 7. The new operating point of the generator would then be point D at the intersection of lines 53 and 56. This shows that the generator would be motoring while the converter would supply current to both the generator and the load. The operating point of the converter would be point E having the same ordinate as point D.

With the connections of Fig. 1 however, the effect of winding 8 is proportional not to the current of armature 7 but to the average load current. When the average load current has the value OC the operating point of generator 6 must be on a line 58 parallel to line 54 and higher than line 54 by the voltage FG induced by the flow of current OC through winding 8. The operating point of the generator is then point H at the intersection of lines 56 and 58 and the operating point of the converter is point K on line 55 at the same ordinate as point H. The current distribution between the generator and the converter is thus substantially improved until regulator 17 causes both the generator and the converter to assume operating point G of abscissa OC on characteristic 53. The transient characteristic of the generator for all variations of load current from value OA may be obtained by joining points H and B. This characteristic is closer to the transient characteristic 55 of the converter than characteristic 53.

The division of current between the converter and the generator will be similarly regulated during transients resulting from variations in the operating conditions of circuit 16 and 18. The resistance of shunt 19 may be made different from that of winding 8 to cause generator 7 to carry a current equal to the converter current when the converter steady state characteristic is different from characteristic 53. The inductance of reactor 21 may also be varied to vary the transient characteristics of the generator. The resistance and inductance of the shunt circuit may also be further modified to cause the converter and the generator to carry currents of different values.

In the embodiment illustrated in Fig. 3 generator 6 is assumed to be disconnectable from circuit 13 by means of switches 61, 62, 63 when converter 17 is to operate alone. Regulator 37 is provided with an additional field winding 64 connected across shunt 19 and reactor 21. Windings 47 and 64 are wound on the core of the regulator with opposite polarity and may be disconnected by means of a switch 65 when the converter is to operate alone. In the present embodiment winding 43 is made much weaker than windings 47 and 64 and spring 42 is weakened to a corresponding extent. When switches 61, 62, 63 and 65 are open and converter 17 supplies the entire load current to circuit 13, regulator 37 causes the converter to deliver current at a substantially constant voltage of value determined by the adjustment of rheostat 46.

When the switches are closed the converter cooperates with generator 6 and winding 47 receives a current proportional to the converter current while winding 64 receives a current proportional to the total load current. The number of turns of the two windings must therefore generally be different, winding 47 having twice the number of turns of winding 64 if the converter and the generator are to carry equal currents and the resistance of shunt 48 is equal to the combined resistance of winding 8, shunt 19 and reactor 21. The influence of winding 43 and spring 42 on the operation of the regulator is then negligible compared to that of windings 47, 64. The flow of current through windings 47, 64 causes displacement of sector 36 until the magneto-motive forces of the two windings become substantially equal and neutralize each other. The result is that the regulator tends to maintain the current through the converter equal to the current flowing through the generator. The regulator therefore inherently imparts to the converter the steady state characteristic of the generator. During transient operation the characteristic of the generator is modified in the same manner as in the embodiment illustrated in Fig. 1. The adjustment of the system may also be modified as above set forth with respect to the embodiment illustrated in Fig. 1.

In the embodiment illustrated in Fig. 4 the converter is assumed always to operate with generator 6. Windings 43 and 64 and spring 42 of regulator 37 are omitted and shunt 19 and reactor 21 are connected across winding 8 through shunt 48. Winding 47 then has the same effect as windings 47 and 64 in the embodiment illustrated in Fig. 3 and the regulator tends to impart to the converter the characteristic of generator 6 and maintains the proper division of current between the converter and the generator during steady state operation. During transient operation the characteristic of the generator is modified in the same manner as in the embodiments illustrated in Figs. 1 and 3. The adjustment of the system may also be modified as above set forth with respect to the embodiments illustrated in Figs. 1 and 3.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. The combination of an alternating current circuit, a direct current circuit, a dynamoelectric machine comprising an armature winding and a field winding serially connected across said direct current circuit, and a current converting system comprising an electric valve for the conversion of current between said circuits, said system having connections with said alternating current circuit and being effectively connected in parallel with said armature winding and in series with said field winding, the connection of said field winding to said armature and said converting system providing for excitation of said field winding in response to the joint current of said armature winding and said converting system.

2. The combination of an alternating current circuit, a direct current circuit, a dynamoelectric machine comprising an armature winding and a field winding serially connected across said direct current circuit, a current converting system comprising an electric valve for the conversion of current between said circuits, said system having connections with said alternating current circuit and being effectively connected in parallel with said armature winding and in series with said field winding, the connection of said field winding to said armature and said converting system providing for excitation of said field winding in response to the joint current of said armature winding and said converting system, and means responsive to the flow of current through said valve for controlling the conductivity of said valve.

3. The combination of an alternating current circuit, a direct current circuit, a dynamoelectric machine comprising an armature winding and a field winding serially connected across said direct current circuit, a current converting system comprising an electric valve for the conversion of current between said circuits, said system having connections with said alternating current circuit and being effectively connected in parallel with said armature winding and in series with said field winding, the connection of said field winding to said armature and said converting system providing for excitation of said field winding in response to the joint current of said armature winding and said converting system, and a shunt connected in parallel with said field winding.

4. The combination of an alternating current circuit, a direct current circuit, a dynamoelectric machine comprising an armature winding and a field winding serially connected across said direct current circuit, a current converting system comprising an electric valve for the conversion of current between said circuits, said system having connections with said alternating current circuit and being effectively connected in parallel with said armature winding and in series with said field winding, the connection of said field winding to said armature and said converting system providing for excitation of said field winding in response to the joint current of said armature winding and said converting system, and a shunt connected in parallel with said field winding and having a ratio of inductance to resistance substantially equal to that of said field winding.

5. The combination of an alternating current circuit, a direct current circuit, a dynamoelectric machine comprising an armature winding and a field winding serially connected across said direct current circuit, a current converting system comprising an electric valve for the conversion of current between said circuits, said system having connections with said alternating current circuit and being effectively connected in parallel with said armature winding and in series with said field winding, the connection of said field winding to said armature and said converting system providing for excitation of said field winding in response to the joint current of said armature winding and said converting system, means responsive to the flow of current through said valve for controlling the conductivity of said valve, and a shunt connected in parallel with said field winding.

6. The combination of an alternating current circuit, a direct current circuit, a dynamoelectric machine comprising an armature winding and a field winding serially connected across said direct current circuit, a current converting system comprising an electric valve for the conversion of current between said circuits, said system having connections with said alternating current circuit and being effectively connected in parallel with said armature winding and in series with said field winding, the connection of said field winding to said armature and said converting system providing for excitation of said field winding in response to the joint current of said armature winding and said converting system, and means responsive to the flow of current through said valve and to the flow of current through said machine for controlling the conductivity of said valve.

7. The combination of an alternating current circuit, a direct current circuit, a dynamoelectric machine comprising an armature winding and a field winding serially connected across said direct current circuit, a current converting system comprising an electric valve for the conversion of current between said circuits, said system having connections with said alternating current circuit and being effectively connected in parallel with said armature winding and in series with said field winding, the connection of said field winding to said armature and said converting system providing for excitation of said field winding in response to the joint current of said armature winding and said converting system, and means responsive to the voltage of said direct current circuit, the flow of current through said valve and the flow of current through said machine for controlling the conductivity of said valve.

8. The combination of an alternating current circuit, a direct current circuit, a dynamoelectric machine comprising an armature winding and a field winding serially connected across said direct current circuit, a current converting system comprising an electric valve for the conversion of current between said circuits, said system having connections with said alternating current circuit and being effectively connected in parallel with said armature winding and in series with said field winding, the connection of said field winding to said armature and said converting system providing for excitation of said field winding in response to the joint current of said armature winding and said converting system, a shunt connected in parallel with said field winding, and means differentially responsive to the magnitudes of the currents in said series winding and in said shunt for controlling the conductivity of said valve.

9. The combination of an alternating current circuit, a direct current circuit, a dynamoelectric machine comprising an armature winding and a field winding serially connected across said direct current circuit, a current converting system comprising an electric valve for the conversion of current between said circuits, said system having connections with said alternating current circuit and being effectively connected in parallel with said armature winding and in series with said field winding, the connection of said field winding to said armature and said converting system providing for excitation of said field winding in response to the joint current of said armature winding and said converting system, a shunt connected in parallel with said series winding, regulating means for controlling the conductivity of said valve operable with a substantial time of response in dependence upon variations in the flow of current between said circuits, and inductive means in said shunt for controlling the current distribution between said converting system and said dynamoelectric machine during the time of response of said regulating means.

JAMES G. LINN.